May 20, 1924.

I. SHORT

DIVIDED LOAD THRUST BEARING

Filed Aug. 7, 1922  2 Sheets-Sheet 1

Ira Short
INVENTOR

BY D. C. Davis
ATTORNEY

May 20, 1924.

I. SHORT

DIVIDED LOAD THRUST BEARING

Filed Aug. 7, 1922

1,494,384

Ira Short
INVENTOR

BY O. C. Davis
ATTORNEY

Patented May 20, 1924.

1,494,384

UNITED STATES PATENT OFFICE.

IRA SHORT, OF ESSINGTON, PENNSYLVANIA, ASSIGNOR TO WESTINGHOUSE ELECTRIC AND MANUFACTURING COMPANY, A CORPORATION OF PENNSYLVANIA.

DIVIDED-LOAD THRUST BEARING.

Application filed August 7, 1922. Serial No. 580,149.

*To all whom it may concern:*

Be it known that I, IRA SHORT, a citizen of the United States, and a resident of Essington, in the county of Delaware and State of Pennsylvania, have invented a new and useful Improvement in Divided-Load Thrust Bearings, of which the following is a specification.

My invention relates to the equalization of multiple thrust bearings, such as is described in a copending application of J. F. Johnson, Serial No. 501,044, filed September 16, 1921 and assigned to the Westinghouse Electric and Manufacturing Company. It relates more particularly to the type of bearing employing a plurality of bearing shoes supported on pressure equalizing mechanism, and it has for its object to provide apparatus of the character designated in which the pressure shall be distributed throughout the bearing shoes of the bearings.

Figure 1:
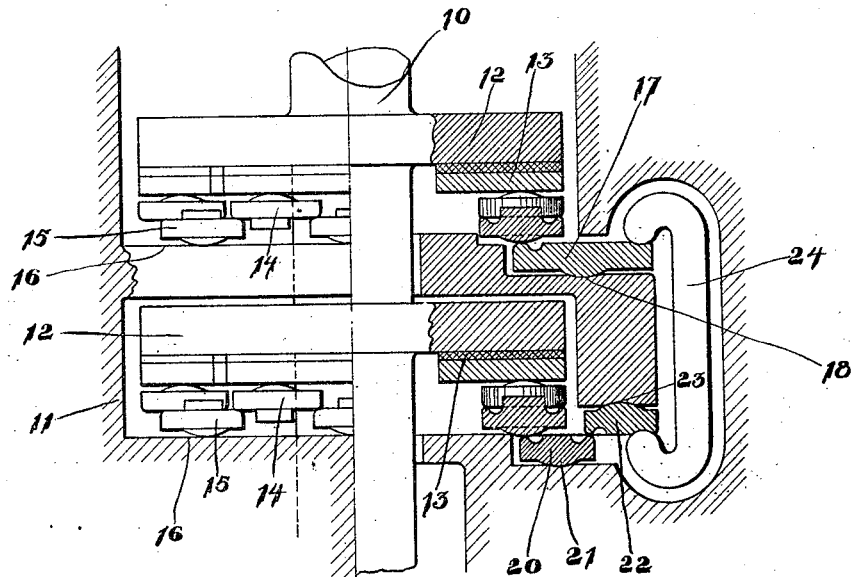
Figure 2:
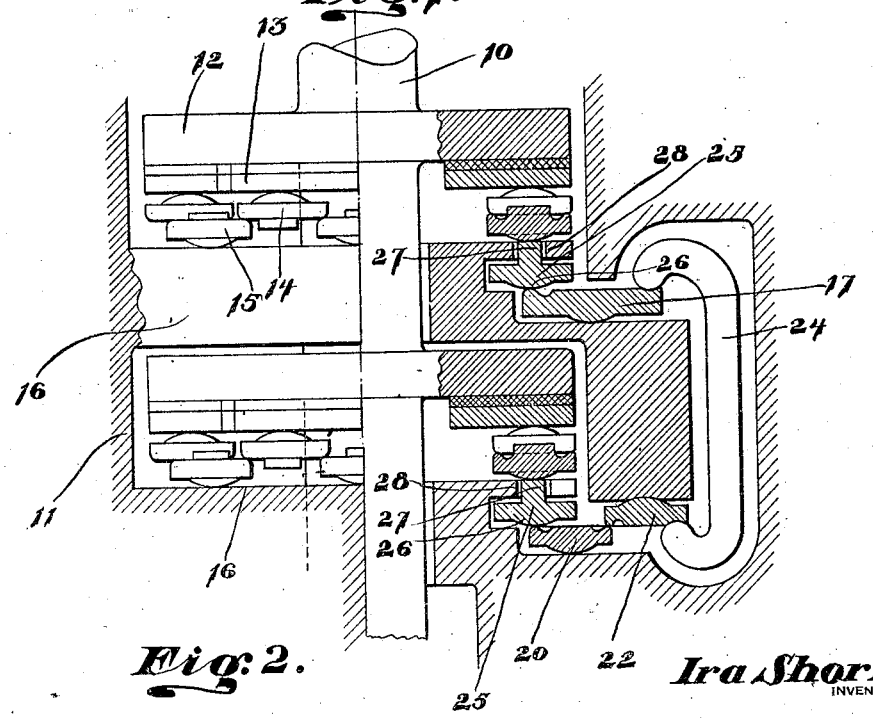
Figure 3:
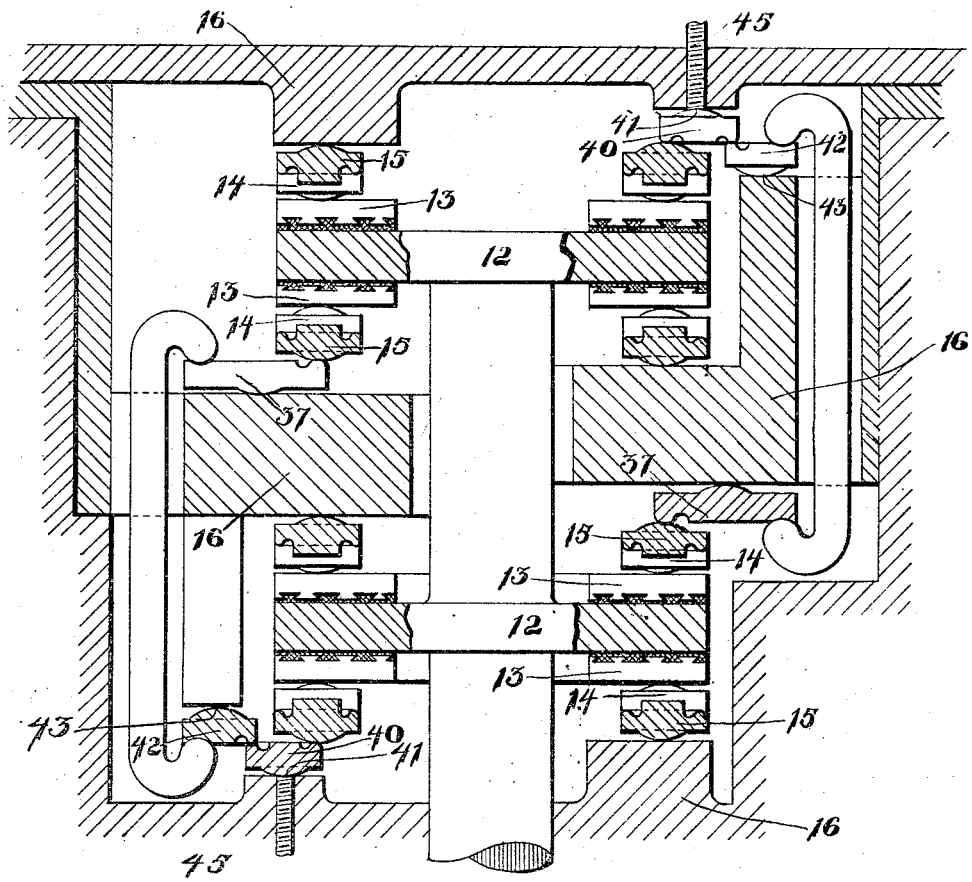

In the drawings, Fig. 1 is a fragmentary detail view of a double thrust bearing showing my improvement applied thereto; Fig. 2 is a similar view of a modified form of my invention, and Fig. 3 is a view, similar to Fig. 1, showing the application of my invention to a double acting bearing.

In accordance with my invention, I use a plurality of bearings of the type shown and described in the patent to Albert Kingsbury, No. 1,361,073 of December 7, 1920, and I provide pressure equalizing or distributing means in conjunction with the bearings, whereby the thrust load will, at all times, be equalized or distributed among the bearings.

Referring now to the drawings for a more detailed description of my invention, I show a rotatable element or shaft 10 and supporting structure 11 between which two thrust bearings are interposed.

Each thrust bearing, as set forth in the patent to Kingsbury, aforesaid, comprises a rotatable thrust collar 12 with which co-operates a series of segmental bearing shoes 13, capable of tilting movement, in operation, to provide for load-sustaining, wedge-shaped oil films in a well known manner, the segmental bearing shoes being in turn supported by a series of leveling or rocker blocks 14 and 15 carried by stationary portions 16 of the supporting structure. The leveling or rocker blocks 14 are provided with convex upper surfaces for cooperation with suitable seats provided in the lower surfaces of the bearing shoes 13, whereby the latter may tilt in the manner referred to. The leveling or rocker blocks 14 are supported on the rocker blocks 15, the latter being provided with convex surfaces which cooperate with the supporting element 16. In operation, it will be obvious that the load is equally distributed among all of the segmental bearing shoes 13 owing to the capability of the two series of leveling or rocker blocks of so moving as to equally distribute the pressure.

In the drawings, I show two bearings of the character indicated, together with means interposed between a leveling or rocker block of one bearing and a leveling or rocker block of the other bearing, whereby the pressure is not only distributed uniformly among the segmental shoes of each of the bearings but is distributed uniformly throughout the bearing shoes of both bearings. In order to secure this result, I provide as shown in Fig. 1, a lever member 17, fulcrumed at its lower side, at 18, and supporting one of the rocker blocks 15. One of the blocks 15 of the other bearing is supported by one end of a rocker or lever member 20, fulcrumed at 21. Another rocker or lever member 22, fulcrumed at its upper side at 23, contacts with the side of the lever member 20 opposite to the supported rocker 15. It will be noted, that when the upper rocker 15 carried by the lever 17 moves in a given direction, the outer side or end of the lever 17 moves in the opposite direction. On the other hand, when the lower block 15 of the lower bearing supported by the lever member 20 moves in a given direction, the outer side or end of the rocker 22 moves in the same direction. Therefore, if the outer sides or ends of the lever members 17 and 22 are connected by a link, pressures may be balanced therebetween. For this purpose I provide a link 24, having hooked ends arranged to engage the outer ends of the lever members 17 and 22.

With bearings of this type, the pressure is uniformly distributed on the segments 13, by means of the equalizing rockers 14 and 15; and, as one of the rockers of one bearing and one of the rockers of the other bearing are supported by equalizing lever mechanism, the load, in addition to being uniformly distributed or equalized between the segments of each bearing, is distributed or equalized between the bearings. In other words, the load is equally divided among the segments of the upper and lower bearings.

In Fig. 2, the structure shown is similar in many respects to Fig. 1, except that, instead of having the levers 17 and 20 supporting the rockers 15 directly, intermediate members 25 are provided so that, should one bearing burn out, the other bearing may still carry the load. Each member 25 has a head portion 26 carried by the levers 17 and 20 and a shank portion 27, passing through an appropriate opening or recess 28 in the stationary portion 16. The load is equalized among all of the segments of the two bearings as before, and the members 25 operate to hold the lever mechanism so that one bearing may carry the load should the other bearing give way or burn out. For example, if the upper bearing should give way, the head 26 of the upper member would be forced up against the member 16 around the recess 28, thereby constituting a firm support for the lever mechanism and the other member 25. If the lower bearing should burn out or give way, the head 26 of the lower member 25 would be forced against the lower portion 16 around the recess 28, in a similar manner, to support the upper member 25 so that the load would be carried by the upper bearing and be equally distributed among the bearing segments thereof.

In Fig. 3 I have illustrated a modification of my bearing adapted to absorb shaft thrust in either direction. In this case, each of the rotatable thrust collars 12 is provided with a set of the segmental bearing shoes 13, adapted to engage each face thereof. Each set of the bearing shoes 13 is supported on a series of leveling blocks 14, supported in turn by a series of blocks 15 in a manner similar to that illustrated in Fig. 1. The blocks 15 are provided with convex surfaces which cooperate with the supporting element 16.

One block of each of the series of leveling blocks 15, which support the oppositely directed loads on the inner faces of the thrust collars 12, is supported on a lever member 37, fulcrumed at 38, on the supporting element 16. One of the blocks in each of the remaining series of leveling blocks 15 is supported by a lever member 40, fulcrumed at 41. Other lever members 42, fulcrumed at 43, contact with the sides of the lever members 40 opposite the rockers 15. The free ends of each of the lever members 42 are connected to the free ends of the corresponding lever members 37 by the links 44, in such a manner as to distribute the thrust loads in each direction among the bearing shoes cooperating with the collars 12 to absorb thrust in that direction.

The fulcrum 41 of each of the lever members 40 rests upon a screw 45, threaded into the supporting element 16, so that the positions of the fulcrums 41 are adjustable axially of the bearing. In this manner, adjustment of each of the sets of bearing shoes 13 may be effected.

From the structure described, the operation of apparatus made in accordance with my invention will be apparent. The load is equally distributed among the segments of each bearing by the supporting rockers and the load is equally distributed among the segments of both bearings by the equalizing lever and linkage connection between one of the rockers of one bearing and a rocker of the other bearing. Should one of the bearings burn out or give way, the structure shown in Fig. 2 will permit the other bearing to carry the load.

While I have shown my equalizing lever system interposed between the leveling or rocker blocks of only two bearings, it will be obvious to those skilled in the art that my invention is capable of application to any practicable number of bearings of the character indicated.

From the foregoing, it will be seen that I have devised a high-capacity thrust bearing, embodying a plurality of bearings of the Kingsbury type, and employing equalizing members for the bearing shoes of each bearing together with equalizing means between the equalizing members of the respective bearings whereby the pressure throughout the shoes of all the bearings may be distributed or equalized.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a plurality of thrust bearings adapted to sustain thrust loads imposed in the same direction, each including a plurality of segmental bearing shoes and rocker elements for distributing the pressure on the bearing shoes, of lever means cooperating with rocker elements of each bearing to distribute the load among the bearings.

2. The combination with a plurality of thrust bearings adapted to sustain thrust loads imposed in the same direction, each including a plurality of segmental bearing shoes and rocker elements for distributing the pressure on the bearing shoes, of a lever having one end supporting a rocker element of one bearing, a second lever having one end supporting a rocker element of the other bearing, a lever for supporting one end of one of said levers, and a connection between the other end of the other of said levers and the last-named lever.

3. The combination with a plurality of thrust bearings adapted to sustain thrust loads imposed in the same direction, each including a plurality of segmental bearing shoes, of levers for supporting rocker elements of said bearings, a reversing lever for one of the levers, and a connection between the outer end of the other lever and the reversing lever to distribute the load applied in the same direction among the bearings.

4. The combination with a pair of thrust bearings adapted to sustain thrust loads imposed in the same direction, each including a plurality of tiltable bearing shoes and rocker blocks for supporting the bearing shoes and distributing the load thereon, of lever means for supporting a rocker block of each bearing, and equalizing means between the lever means.

5. The combination with a pair of thrust bearings adapted to sustain thrust loads imposed in the same direction, each including a plurality of tiltable bearing shoes and rocker blocks for supporting the bearing shoes and for distributing the load thereon, of pressure-equalizing means for supporting rocker blocks of the bearings.

6. The combination with a pair of thrust bearings adapted to sustain thrust loads imposed in the same direction, each including a plurality of tiltable bearing shoes and rocker blocks for supporting the bearing shoes and distributing the load thereon, of movable means for supporting a rocker block of each bearing, means for limiting the movement of each movable means in the direction in which it causes the rocker blocks to move to increase the bearing pressure, and equalizing means between the movable means to distribute the load thereon.

7. The combination with a plurality of thrust bearings, each having a plurality of bearing shoes, and leveling blocks of the bearings, means carried by each bearing for limiting movement of the movable support toward the bearing, and an equalizing lever system between the movable blocks for distributing the load on the bearings.

8. The combination with a plurality of thrust bearings, each including a rotatable thrust collar, a plurality of bearing shoes, a supporting element, and a plurality of rocker blocks interposed between the bearing shoes and the supporting element, of a movable support for one of the rocker blocks of each bearing, a shoulder carried by each supporting element for limiting movement of a movable support in one direction, and a reversing lever system for equalizing the load on the bearings in the same direction.

In testimony whereof, I have hereunto subscribed my name this 3rd day of August, 1922.

IRA SHORT.